July 10, 1934. H. C. RAFETTO 1,966,312
APPARATUS AND METHOD FOR FREEING CLAY AND SIMILAR MATERIALS
FROM STONES AND OTHER FOREIGN BODIES
Filed April 14, 1928  4 Sheets-Sheet 1
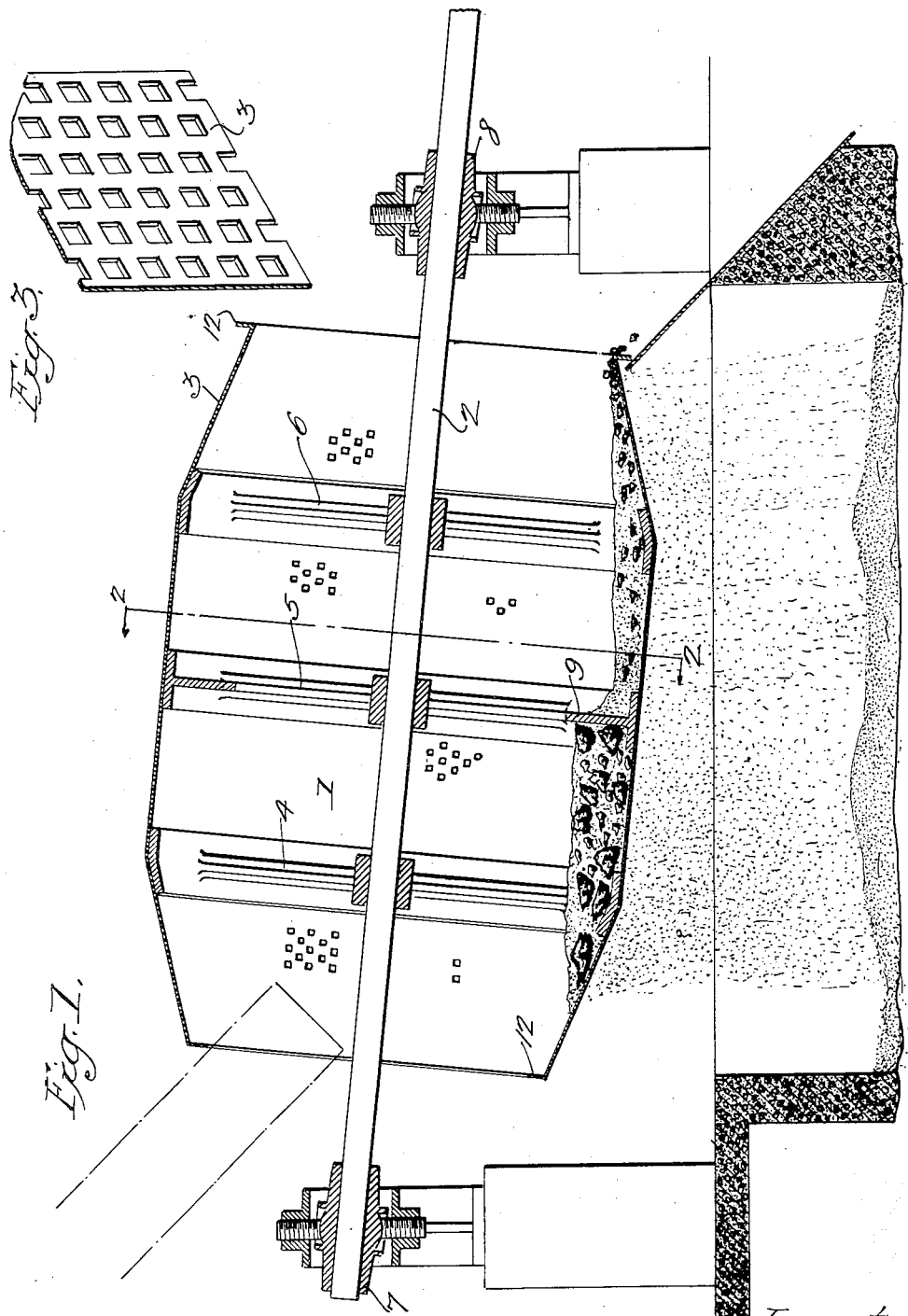

July 10, 1934. H. C. RAFETTO 1,966,312
APPARATUS AND METHOD FOR FREEING CLAY AND SIMILAR MATERIALS
FROM STONES AND OTHER FOREIGN BODIES
Filed April 14, 1928 4 Sheets-Sheet 2
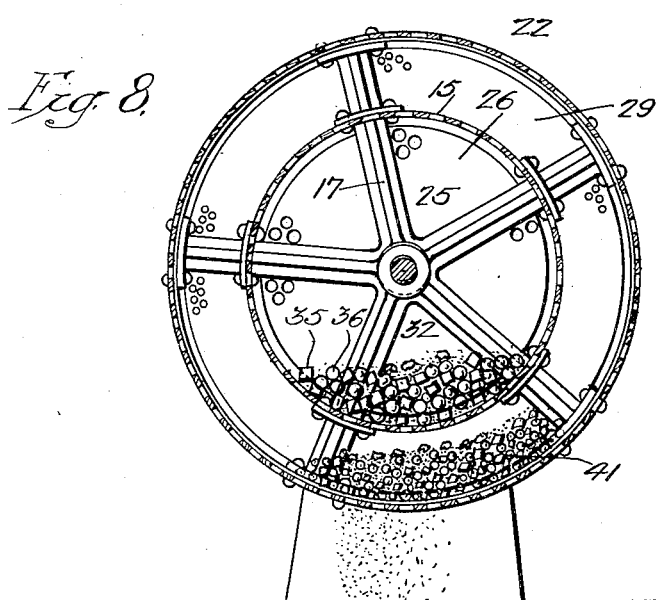
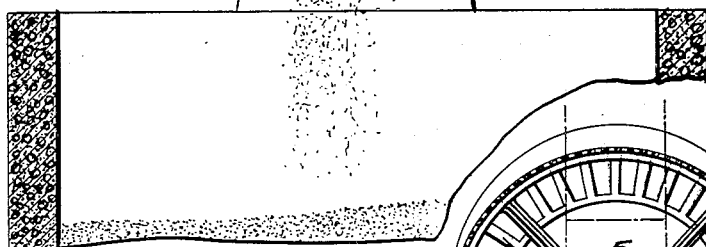
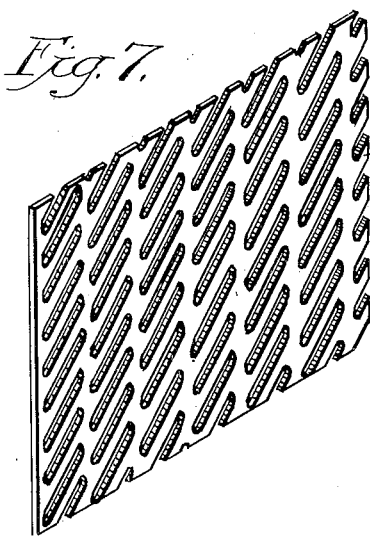
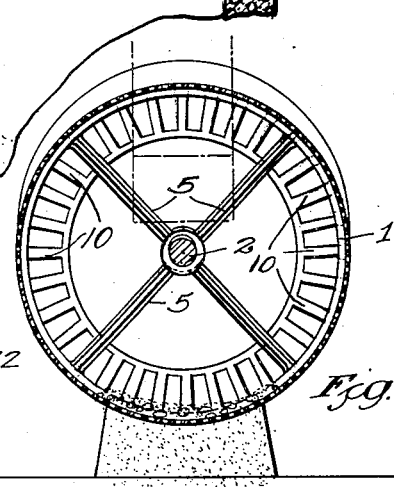
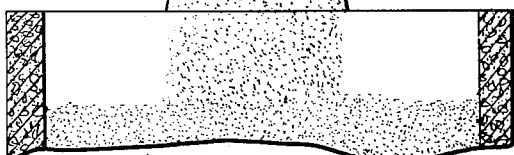

July 10, 1934. H. C. RAFETTO 1,966,312
APPARATUS AND METHOD FOR FREEING CLAY AND SIMILAR MATERIALS
FROM STONES AND OTHER FOREIGN BODIES
Filed April 14, 1928 4 Sheets-Sheet 3

Inventor:-
Herbert C. Rafetto
by his Attorneys
Howson & Howson

July 10, 1934.    H. C. RAFETTO    1,966,312
APPARATUS AND METHOD FOR FREEING CLAY AND SIMILAR MATERIALS
FROM STONES AND OTHER FOREIGN BODIES
Filed April 14, 1928    4 Sheets-Sheet 4

Inventor:
Herbert C. Rafetto.
by his Attorneys,
Howson & Howson

Patented July 10, 1934

1,966,312

UNITED STATES PATENT OFFICE 1,966,312

APPARATUS AND METHOD FOR FREEING CLAY AND SIMILAR MATERIALS FROM STONES AND OTHER FOREIGN BODIES

Herbert C. Rafetto, Wayne, Pa.

Application April 14, 1928, Serial No. 270,044

9 Claims. (Cl. 83—9)

This invention relates to improvements in apparatus for treating clay and similar materials used in the manufacture of bricks and building blocks to eliminate foreign bodies such as stones and to provide a substantially homogeneous mass.

More generally, the invention relates to improvements in apparatus and machines for removing hard materials from relatively soft plastic or friable substances.

The immediate object of the invention is to provide apparatus of relatively simple form which will effectively separate stones from the clay constituting the raw material used in the manufacture of bricks. In the manufacture of bricks and the like under the current practice, it is customary first to dry the material and then to treat it in relatively expensive rolling apparatus including tapered rolls whose function it is to remove the larger stones from the clay mass. Thereafter, the mass containing the smaller stones is ground to comminute the stones and to afford a homogeneous product. The grinding involves numerous screening operations the tailings of which are returned for further grinding. So far as I am aware, there has been no machine developed in this art prior to my invention capable of removing all the stones from the clay, and the grinding operation consequently has been an essential part of the treatment.

I have discovered that not only the larger stones but also stones of small size may be removed from clay bodies by means of simple and relatively cheap apparatus whereby the operation of preparing the clay is materially facilitated, the production increased and the cost of operation greatly reduced, all as hereinafter set forth.

In the attached drawings:

Figure 1 is a longitudinal section through a drum forming a part of my improved apparatus;

Fig. 2 is a transverse section on the line 2—2, Fig. 1;

Fig. 3 is a fragmentary view showing the character of the perforated plates of which the drum shown in Figs. 1 and 2 is formed;

Fig. 7 is a fragmentary view showing the character of the perforations in the outer drum, and Fig. 8 is a transverse section on the line 8—8, Fig. 4, showing the character of the tumbler or crushing elements.

Figure 4:
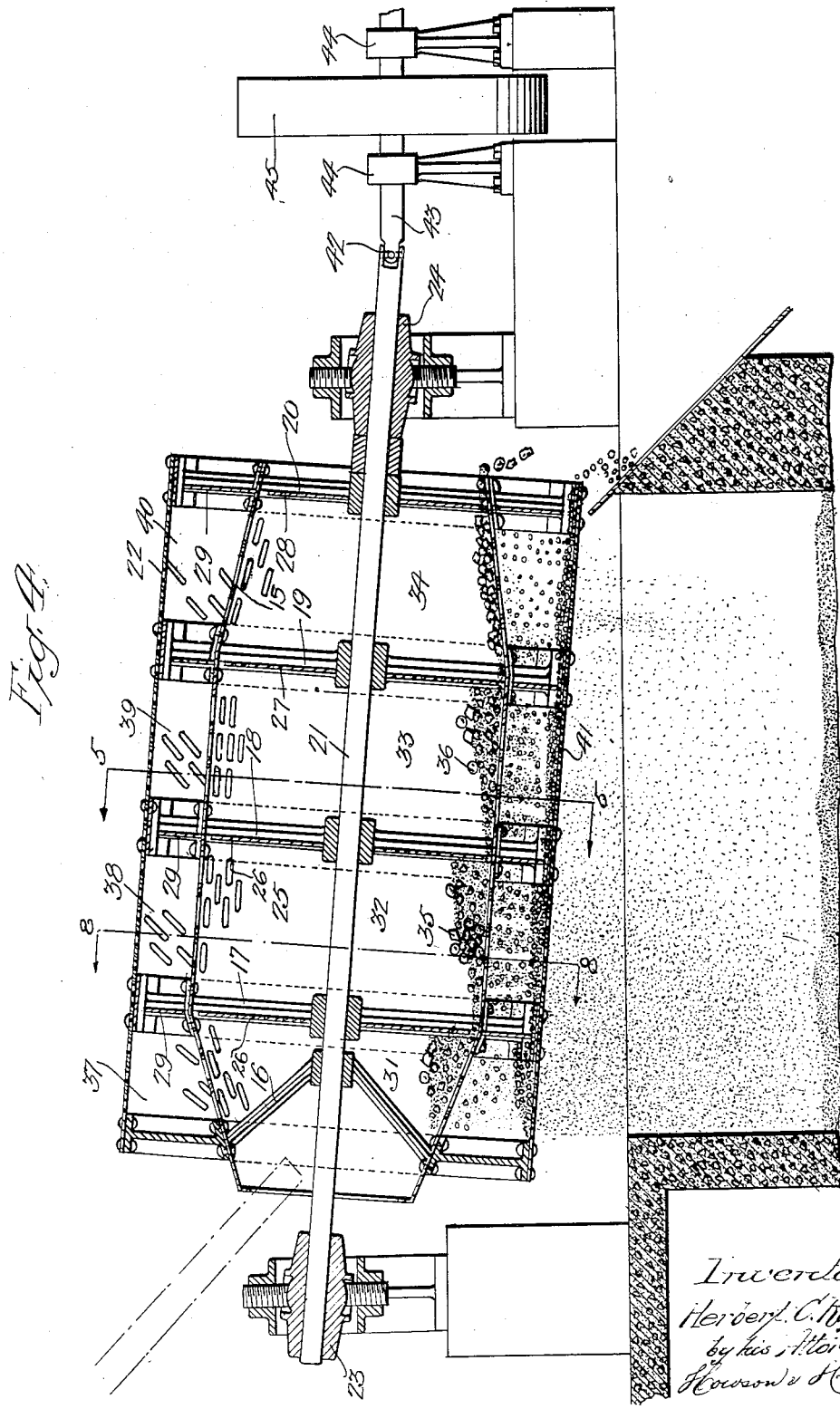
Fig. 4 is a longitudinal sectional view of a double drum constituting a further part of the apparatus.

Referring to the drawings, my improved apparatus comprises in part a rotary drum 1, see Figs. 1 to 3, inclusive. This drum which is mounted on a shaft 2 consists of a foraminous shell 3 preferably made of perforated metal, as hereinafter set forth, which is supported in the present instance upon three spiders, 4, 5 and 6, projecting from the shaft 2. The ends of the drum are left open and the extremities also are contracted to the form of truncated cones, as clearly illustrated and for a purpose hereinafter set forth. The shaft 2 is journaled in bearings 7 and 8, and these bearings are preferably so arranged that the shaft lies at an appreciable angle to the horizontal with that end of the drum into which the material is introduced elevated above the opposite or discharge end. The bearings are preferably adjustable, as shown, to permit some variation of the angularity of the shaft.

Approximately at the mid point of the drum and in the present instance integral with the spider 5, a narrow partition 9 is provided which extends inwardly from the inner face of the shell 3 and which extends completely around the inner circumference thereof. The character of this partitioning wall 9 which may be approximately one foot in the radial dimension is illustrated in Fig. 2, which shows the partition composed in effect of a plurality of radial bars 10 which in a preferred embodiment are approximately three inches in thickness and which are spaced apart at their outer ends a distance of approximately 6″. This partition may be an integral part of the spider structure 5, as illustrated in the present instance, or may be separate therefrom as desired.

As illustrated in Fig. 3, the shell 3 in its preferred form consists of perforated steel plates $\frac{5}{16}$″ in thickness and having ¾″ square holes 11 arranged in staggered relation with approximately ⅝″ space between the sides of adjacent apertures. It will be noted also that a rim 12 is provided at each end of the drum, that at the receiving end of the drum projecting inwardly in the present instance, and the flange at the delivery end projecting outwardly. These rims or flanges function to reinforce the ends of the shell, and the flange at the delivery end may be utilized if desired to support a partitioning flange which will function to retard the discharge of material from the drum.

The apparatus further comprises as illustrated in Figs. 4 to 8, inclusive, a second rotary drum consisting of an inner cylindrical shell 15 which is supported on spiders 16, 17, 18, 19 and 20, which project from a rotary shaft 21. The spiders 17, 18, 19 and 20 are extended beyond the shell 15 to support a second and outer cylindrical shell 22 which is substantially the same length as the shell 15 but which unlike the shell 15 is of uniform diameter throughout as illustrated. As shown in Fig. 4, the shell 15 is contracted at the opposite ends after the manner of the shell 3 of the drum 1 previously described. The shaft 21 is journaled in bearings 23, 24, which preferably are so arranged that the shaft forms an appreciable angle with the horizontal whereby that end of the drum 25, constituted by the shells 15 and 22 and the associated parts, into which material is fed, as hereinafter set forth, is elevated above the opposite or discharge end. The bearings 23 and 24 are preferably adjustable to permit adjustment of the angularity of the shaft 21.

Figure 6:
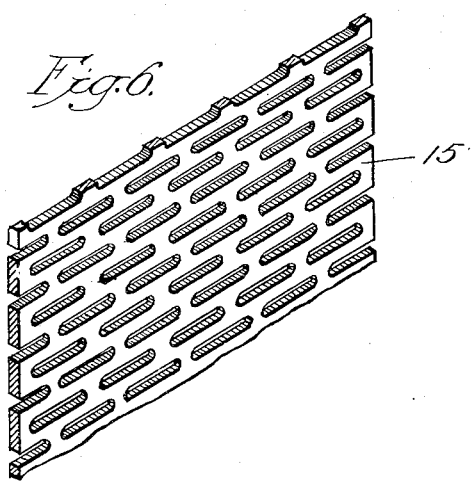
Fig. 6 is a fragmentary view of a portion of the perforated plates of which the inner drum is formed.

The shell 15 preferably is composed of perforated sheet metal such for example as that illustrated in Fig. 6. The sheet metal of which this shell is formed may in a preferred form be $\frac{3}{16}''$ steel having therein $\frac{1}{16}''$ wide slotted openings approximately $1''$ long with a space of approximately $\frac{1}{16}''$ between the openings. The shell 22 may be made of steel plate of $\frac{1}{16}''$ thickness or greater having $\frac{1}{16}''$ slotted openings approximately $\frac{3}{4}''$ long and arranged diagonally in rows as illustrated in Fig. 7, the space between these slotted openings being approximately $\frac{1}{16}''$. In a preferred form of the apparatus, the inner shell may have a diameter of about five feet, while the outer shell may have a diameter of seven feet. It will be understood, however, that the dimensions and sizes as expressed above may vary widely and are mentioned for illustrative purposes only.

Upon the arms of the spiders 17, 18, 19 and 20 are mounted partitioning plates, these plates being in the present instance in two sections one of which extends upwardly from the shaft 21 and stops short of the inner face of the shell 15, while the second section in each instance extends from the outer face of the shell 15 and stops short of the inner surface of the shell 22. This general arrangement is clearly illustrated in Figs. 4 and 5. These partitions in each instance extend completely around the entire circumference of the drum, and preferably each partition includes at least one detachable section or door in the inner and outer spaces to afford access to the interiors of the various chambers. The inner section of the partitions associated with the spiders 17 and 18, designated in Figs. 4, 5 and 8 by the reference numeral 26, may be made of a $\frac{1}{4}''$ steel plate perforated with $2''$ circular holes, the spaces between the adjacent holes being approximately $2''$. In the present embodiment, the outer edge or periphery of these partitions stops sufficiently short of the shell 15 to provide a $2''$ space which extends completely around the circumference and is unobstructed except for the arms of the spiders which pass therethrough. The partitions 27 extending between the arms of the spider 19 may be made of $\frac{1}{4}''$ steel perforated with $1\frac{1}{2}''$ diameter circular holes spaced approximately $1\frac{1}{2}''$ apart; while the partitions 28 extending between the arms of the spider 20 may also be composed of $\frac{1}{4}''$ thick steel plate perforated with $1''$ holes which may be approximately $1''$ apart. The space between the periphery of the partition 27 and the shell 15 may be approximately $1\frac{1}{2}''$, while the periphery of the partition 28 is spaced from the shell 15 by a space of $1''$.

Figure 5:
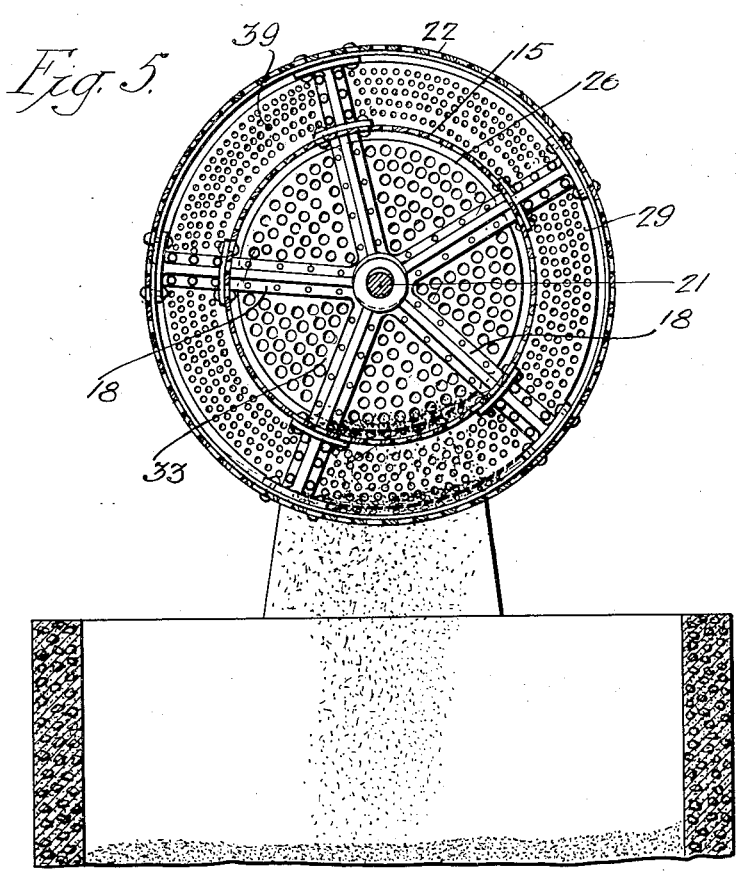
Fig. 5 is a transverse section on the line 5—5, Fig. 4.

The outer section of each of the partitions 26, 27 and 28 which extend downwardly from the inner shell 15 to a point short of the outer shell 22 as previously described and which are in each instance supported between the outer ends of the arms of the spiders 17, 18, 19 and 20, respectively, may consist of $\frac{1}{4}''$ steel plate perforated with $1''$ holes spaced approximately $1''$ apart, and the space between the outer edges of these partition sections and the shell 22 may be approximately $1''$ in each instance. These partitions are illustrated in Figs. 4 and 5, in which they are designated by the reference numeral 29.

The partitions described above divide the interior of the shell 15 into compartments 31, 32, 33 and 34, respectively. Each of the first two compartments 31 and 32 which are nearest the end of the drum into which the material to be treated is fed receives an approximately equal number of $3''$ square and round iron tumblers, the number of these elements depending upon the rate at which the material is fed into the drum and the inclination of the drum to the horizontal, as hereinafter set forth. The chamber 33 carries also a number of these tumbler elements which in this instance may be approximately $2''$ in diameter and preferably are in part square in form and in part round. The compartment 34 may carry also a set of similar tumblers which in this instance are $1\frac{1}{2}''$ in size. The tumbler elements are illustrated in Fig. 8, those of rectangular form being designated by the reference numeral 35, and those of round form being denoted by the numeral 36.

The space between the inner shell 15 and outer shell 22 is also divided into a number of chambers 37, 38, 39 and 40, respectively, by the partitions 29, and each of these chambers is provided with a plurality of tumbler elements which may be approximately $1\frac{1}{2}''$ in size and may be of square and round form as described above. These tumbler elements are indicated generally by the reference numeral 41.

It will be noted that the shaft 21 is connected through a flexible coupling 42 with a drive shaft 43, the latter being supported in bearings 44, 44 and carrying a pulley 45 by means of which the shaft is operatively connected with a suitable source of power. A similar device may be utilized for driving the shaft 2 of the drum 1.

In operation, clay from the pit containing stones of varying sizes may be fed without previous treatment to the drum 1 which is rotated as described. By reason of the inclination of the drum, there is a tendency for the material to feed from the upper end to the lower end, and this movement is retarded by the partition 9. During rotation of the drum, the relatively small particles of clay pass through the openings 11 in the shell 3, the stone introduced with the clay functioning after the manner of tumblers to grind the clay and to force it through the said openings 11, and this grinding action is accentuated and aided by the rectangular shape of said openings. By reason of the partition 9, the stones of larger size are retained in the first half of the drum and function therein as described to grind and comminute the clay, which thereupon passes through the openings 11 in the shell. Also portions of the clay mass and the stones of intermediate size pass through the spaces between the radial elements 10 of the partition 9 into the second half of the drum, this body of clay already partly ground being further comminuted by the cascading effect of the smaller stones and also by the excess of large stones which having accumulated in the first half of the drum pass over the top of the partition 9 and into the second half. By reason of this continued grinding action in the second half of the drum, the clay with stones under ¾" in size passes through the openings 11 and is deposited in a suitable bin or passed directly into the drum 25 for further treatment, as hereinafter set forth. The inclination of the drum 1 is such, and the feed of the material into the drum is so regulated that all of the clay fed into the drum passes through the openings 11 in the shell, only the stones of various sizes, which have been separated as described from the clay mass, passing out and being discharged from the open discharge end of the drum. When properly regulated as to inclination and feed, the apparatus has been found extremely efficient in separating the larger stones from the clay, this work being done in relatively short time and the stones being discharged from the end of the drum in clean condition and free from clay.

The clay and smaller stones which have passed through the openings 11 in the shell 3 are passed into the shell 15 of the drum 25 which is continuously revolved as described above. The material which by reason of the inclination of the drum has a tendency to pass toward the opposite end from that through which it is introduced is acted upon by the cascading elements 35 and 36, which further break up and comminute the clay and force it through the openings in the shell 15 into the outer shell 22. The perforated partitions and the openings between the outer edges of the partitions and the shell 15 provide for a continuous advance of the material from the receiving end of the drum to the opposite or discharge end, and with a given inclination of the drum, the feed is so controlled and the number of the tumblers in the various inner compartments of the drum is such that the entire body of clay will be passed through the apertures of the shell 15 prior to its reaching the discharge end of the drum. The stones, however, pass continuously from one end of the drum to the other and are eventually discharged in entirely clean condition and free from clay at the discharge end of the drum.

The clay and such of the small stones as may pass through the openings in the shell 15 pass into the outer chambers 37 to 40, inclusive, in the shell 22, and are therein further acted upon by the tumblers 41 to still further break up the clay and to force it through the openings in the shell 22. The small stones which have passed through the openings in the shell 15 with the clay are fed gradually from one compartment to another and to the discharge end of the drum where they emerge free from clay. All of the clay passes through the shell 22 and is received in a suitable bin in finely ground condition and free from stones. By means of the double shell construction of the drum 25 and by carefully regulating the feed, the angle of the drum and the number of working tumblers in the various chambers, the actual work of breaking up the clay may be distributed with substantial uniformity through the various chambers, with the result that a continuous and uniform action is obtained delivering with a maximum efficiency the finely ground clay from the shell 22.

I am aware that screens have been used in the manufacture of bricks prior to my invention. These screens, however, functioned solely for the purpose of eliminating the larger particles of clay and associated stone, and those parts of the material which failed to pass the screen were returned to a grinding machine for further grinding to reduce it to the desired size. I am also aware that machines have been used including pinching rolls whose function it has been to remove the larger stones from the clay taken from the pit. So far as I am aware, however, I am the first to provide a machine of simple form which performs not only the operations of grinding and comminuting the clay but which functions also to remove in substantially clean condition stones of all sizes from the clay with the comminuting and grinding operations. The economy afforded by apparatus such as described will be realized by those familiar with the art. Not only it is unnecessary to heat and dry the clay taken from the pit, but the costly cumbersome and inefficient machinery for removing the larger stones and the costly grinding apparatus whereby the smaller stones are broken up and powdered is dispensed with, and in conjunction with this grinding operation the separate screening to separate the finer particles from the coarse, which latter are returned for further grinding operations. In the present instance, the clay as it is taken from the pit is fed in a substantially continuous operation through relatively simple apparatus which simultaneously comminutes the clay, screens it and separates the stone.

I claim:

1. In apparatus for freeing clay and similar materials from stones and other foreign bodies, the combination with a perforated drum and means for actuating the drum, of means for introducing a clay material into the drum, means providing for the advancement of the material through the drum, partitioning means dividing the drum longitudinally into a plurality of working chambers, said partitions being perforated to provide communication between said chambers, means in said chambers for breaking up the clay material and for passing it through the perforations in the drum, an outer perforated shell surrounding the drum adapted to receive the material passing through the drum perforations, partitioning means dividing the interior of said shell into working compartments corresponding with the chambers of the drum, said partitioning means being perforated, and means in said chambers for further grinding the material received from the drum and for passing it through the apertures in the shell.

2. In apparatus for freeing clay and similar materials from stones and other foreign bodies, the combination with a perforated drum and means for actuating the drum, of means for introducing a clay material into the drum, means providing for the advancement of the material through the drum, and a plurality of partitions dividing the interior of the drum into a plurality of communicating transverse chambers and extending outwardly in the drum to a point short of the perforated shell of the latter.

3. In apparatus for freeing clay and similar materials from stones and other foreign bodies, the combination of a drum through which the material is adapted to be passed having inner and outer perforated walls, the perforations of said inner wall being larger than the perforations of the outer wall, and perforated inner and outer transverse partitions dividing the drum longitudinally into a plurality of communicating compartments, the perforations of the inner partitions decreasing in size toward the discharge end of the drum, and the perforations of the outer partitions corresponding in size substantially with the perforations of the inner partitions nearest the discharge end of the drum.

4. In apparatus for freeing clay and similar materials from stones and other foreign bodies, the combination with a drum through which the material is adapted to be passed having inner and outer perforated walls, the perforations of said inner walls being larger than those of the outer walls, inner transverse partitions dividing the inner drum longitudinally into a plurality of compartments, said partitions terminating short of the inner surface of the drum to provide spaces through which the said compartments communicate, said spaces decreasing in width toward the discharge end of the drum, and outer partitions corresponding to said inner partitions and extending from the outer surface of the inner drum to points short of the inner surface of the outer drum whereby the outer drum is divided into communicating chambers, the spaces between the outer edges of the partitions and the inner surface of the outer drum corresponding substantially in width with the perforations of the outer wall.

5. In apparatus for freeing clay and similar materials from stones and other foreign bodies, the combination of a perforated inclined drum through which the material is adapted to pass, apertured partitioning means dividing the drum longitudinally into a plurality of communicating compartments, the apertures in said partitions decreasing in size toward the discharge end of the drum, an outer perforated drum surrounding the drum first named and adapted to receive material passing through the perforations of said drum, the perforations of the outer drum being smaller than those of the inner drum, and partitions dividing the outer drum into a plurality of compartments corresponding substantially with the compartments of the inner drum.

6. The method of freeing clay and similar materials from stones and other foreign bodies, which consists in tumbling raw material including stones of different sizes in a rotary perforated drum whereby the stone content is made to grind the clay simultaneously with the screening operation, and treating the screened material in rotary perforated drums including tumblers whereby the material is progressively ground and screened to the desired uniform composition.

7. The method of obtaining a comminuted clay of uniform consistency, which consists in taking raw material including clay and stones of different sizes, introducing said clay into a rotary perforated drum whereby the clay is ground and screened and the larger stones removed, and thereafter introducing the clay into a second perforated drum including tumblers in which the clay and the remaining stone are ground progressively to the desired comminuted state.

8. The method of freeing raw pit clay material or equivalent aggregate from stone of various and considerable sizes constituting a natural element of said aggregate which consists in tumbling said material in its natural state and substantially as removed from its natural bed in a rotary perforated drum whereby the clay is ground and screened and so separated from the stone.

9. The method of separating pit clay or equivalent material in substantially unadulterated form from a mined aggregate containing stones of various and considerable size, which consists in continuously feeding said aggregate in its natural state and substantially as removed from its natural bed into a rotary perforated drum, and rotating the drum whereby the clay in its natural state and substantially as removed from its natural bed is ground and screened and so separated from the stone and the stone is continuously evacuated from the drum.

HERBERT C. RAFETTO.